Patented Feb. 17, 1970

3,496,269
PROCESS FOR PRODUCING SANITIZING TABLETS COMPRISING AN ISOCYANURATE OR AN ISOCYANURIC ACID AND PARADICHLOROBENZENE
John S. Thompson, Princeton Junction, N.J., Russell R. Keast, Yardley, Pa., and Ewald H. Krusius, South River, N.J., assignors to FMC Corporation, New York, N.Y., a corporation of Delaware
No Drawing. Continuation-in-part of application Ser. No. 415,174, Dec. 1, 1964. This application Jan. 26, 1966, Ser. No. 523,037
Int. Cl. A01n *17/00;* A61j *3/00*
U.S. Cl. 424—20    6 Claims

ABSTRACT OF THE DISCLOSURE

Slow dissolving, sanitizing tablets are produced containing 5 to 25% of either trichloroisocyanuric, dichloroisocyanuric acid, sodium dichloroisocyanurate or potassium dichloroisocyanurate and paradichlorobenzene by heating the mixture until the paradichlorobenzene melts, agitating and cooling the melted mixture, finely dividing the mixture to form small, discrete particles coated with paradichlorobenzene, and pressing the discrete particles under pressure into compacted shapes; the discrete particles are uniformly dispersed throughout the tablet, and each particle is completely enclosed within a coating of paradichlorobenzene.

---

This application is a continuation-in-part of U.S. application Ser. No. 415,174, filed Dec. 1, 1964 now abandoned in the names of the present inventors.

This invention relates to a novel method for producing sanitizing compositions, and, more particularly, to the production of slow dissolving sanitizing compositions containing mixtures of paradichlorobenzene and a chlorocyanuric acid or salt thereof.

In the production of compositions suitable for sanitizing applications, it is desired to release the active sanitizing agent, normally chlorine, at a rate sufficient to effect its sanitizing function, but without releasing excessive amounts of chlorine over that required for sanitizing purposes. These compositions are dissolved and subsequently release their active chlorine by continuous or intermittent contact with a water source which is to be purified. If the rate of dissolution is too high and chlorine evolution proceeds too rapidly, the excess amount of active chlorine released is wasted.

It is known that the release of chlorine from certain agents such as 1,3-dichloro-5,5-dimethylhydantoin can be controlled by blending this compound with paradichlorobenzene, a dissolution retardant. In accordance with the disclosure set forth in U.S. Patent 2,789,078, issued on Apr. 16, 1957 to Ralf B. Trusler, a mixture of 1,3-dichloro-5,5 - dimethylhydantoin and paradichlorobenzene are fused together and poured into a mold, whereupon the mixture is cooled into a cake and removed from the mold. This technique, while effective in decreasing the rate at which chlorine is evolved, has certain drawbacks.

Initially, when the fused mixture of 1,3-dichloro-5,5-dimethylhydantoin and paradichlorobenzene is poured into the mold and cooled, the 1,3-dichloro-5,5-dimethylhydantoin segregates in the base section of the mold and is not uniformly distributed throughout the cake. This results in the nonuniform release of chlorine as the cake progressively dissolves in use. Thus, proportional dissolving of the cake does not necessarily result in proportional distribution of the chlorine in the cake.

A second difficulty with this technique for making molded sanitizing compositions is that at the fusing temperature of the paradichlorobenzene the 1,3-dichloro-5,5-dimethylhydantoin is heat sensitive and decomposes, resulting in a substantial loss of its chlorine content. In addition to the loss of active chlorine, the thermally labile 1,3-dichloro-5,5-dimethylhydantoin discolors at the fusing temperature and darkens the entire cake making it aesthetically unattractive to the consumer.

Other difficulties with sanitizing tablets containing 1,3-dichloro-5,5-dimethylhydantoin are that the particles of this active ingredient, even when liberated from the dissolution retardant, dissolves so slowly in water that many of the fine particles are sewered before releasing their active chlorine. Additionally, this active ingredient primarily releases its active chlorine as "bound" chlorine, i.e, chloramines, rather than as "free" available chlorine, i.e., HOCl, which is preferred for sanitizing purposes.

As a result of these drawbacks, a need is present for a method for producing sanitizing compositions which have a homogeneous distribution, which are not discolored, which have controlled dissolving properties, and which release a steady flow of active chlorine over extended periods.

It is an object of the present invention to produce a sanitizing composition in a shape which is convenient for use, which is present in a homogeneous mixture throughout the shape, and which does not release and waste active chlorine in the make-up of the composition.

This and other objects will become apparent from the following description of this invention.

We have now found that effective, slow dissolving sanitizing tablets can be produced by blending together a mixture containing from about 5 to about 25% of a chlorinated cyanuric acid, or salt thereof, and paradichlorobenzene in amounts sufficient to make up the balance of the mixture (normally from about 10 to about 95%), heating the resulting mixture until the paradichlorobenzene melts, maintaining the melted mixture in constant agitation and in a homogeneous condition while allowing the mixture to cool, finely dividing the mixture to form small discrete particles containing chlorinated cyanuric acid or salts thereof coated with paradichlorobenzene, and pressing the discrete particles into compacted shapes such as tablets.

As a result of the above technique, the individual particles of the chlorinated cyanuric acid or salt reagent are encased in a coating of paradichlorobenzene. When these particles are compressed into a tablet, the resulting tablet has a homogeneous distribution of the chlorine releasing agent throughout the tablet. In addition, the chlorinated cyanuric acid or chlorinated cyanuric acid salt releases "free" available chlorine in aqueous solution, i.e., HOCl, has good heat stability, and does not lose active chlorine at the temperatures used to melt the paradichlorobenzene and to coat the particles of chlorine releasing agent.

In carrying out the present invention the paradichlorobenzene and the dry chlorine releasing agent are blended together and heated until the paradichlorobenzene commences to melt. This normally occurs at temperatures above about 55° C. If other ingredients are desired in the finished composition, they are added to the mix prior to the melting of the paradichlorobenzene. After the paradichlorobenzene has melted, the mixture is constantly stirred so that the particles of the dry chlorine releasing agent and any other reagent are completely coated with the melted paradichlorobenzene. Thereafter, the mixture is permitted to cool during which agitation and mixing of the mixture is continued. As the mixture cools, it separates into agglomerates made up of discrete particles of the dry chlorine releasing agent and other ingredients coated with paradichlorobenzene. The resulting cooled agglomerates are normally too large for direct incorporation into a pelletizing mixture and these are finely divided by conventional grinding means in order to subdivide the agglomerate into its finer discrete particles. During this mild grinding step the basic structure of the discrete particles, i.e., a dry chlorine releasing agent coated with paradichlorobenzene, remains intact.

The resulting ground mixture is then placed in a die and pressed into tablets. The pressing is normally accomplished using pressures of from about 5000 to about 10,000 lbs. The amount of pressure employed can be varied depending on the ingredients in the mix in order to obtain a cohesive, strong tablet.

In the formation of the present tablets the paradichlorobenzene is normally incorporated in amounts of from about 10 to about 95%. Amounts of paradichlorobenzene higher than 95% can be used but this necessitates decreasing the amount of the dry chlorine releasing agent; if too little of the dry chlorine releasing agent is present, insufficient amounts of chlorine will be released to perform its sanitizing function. Amounts of paradichlorobenzene lower than 10% are normally not desired since the tablet becomes too rapidly dissolving for most commercial applications. Where it is desired to incorporate substantial amounts of other additives in addition to the dry chlorine releasing agent, paradichlorobenzene contents of from 10 to 50% have been found satisfactory.

The dry chlorine releasing agent used in the present formulation may be a chlorinated cyanuric acid, such as trichloroisocyanuric acid or dichloroisocyanuric acid, or a chlorinated cyanuric acid salt, such as either the sodium or potassium salt of dichloroisocyanuric acid. This dry chlorine releasing agent is added to the formulation in amounts from about 5 to about 25% of the total weight of the mixture. Amounts lower than 5% can be used provided that the dry chlorine releasing agent releases sufficient chlorine to perform its sanitizing function. Larger amounts than 25% of the dry chlorine releasing agent can be employed, but they have thus far been found unnecessary, since small amounts of this agent are sufficient to perform their sanitizing function.

In addition to paradichlorobenzene and the dry chlorine releasing agent, the compositions may include, if desired, a water softening agent. These agents can be complex polyphosphates such as tetrasodium pyrophosphate or pentasodium tripolyphosphate, or polyphosphate glasses produced by condensing molecules of sodium orthophosphate to form long chains of molecules having P—O—P bonds. Among these polyphosphate glasses may be included "Sodaphos," having a chain length of about 6 and $P_2O_5$ content of 63.8% by weight, "Hexaphos" having a chain length of about 13 and a $P_2O_5$ content of 67.5% by weight, and "Glass H" having a chain length of about 21 and a $P_2O_5$ content of 68.7% by weight. Alternately, other known organic water softening agents such as nitrilotriacetic acid or ethylenediaminetetraacetic acid and its salts can likewise be used.

The amount of water softening agent which is employed is not critical and will depend in part upon the water source which is being treated. Amounts from about 25% to as high as 65% have been found useful.

The primary application for the instant tablets are for use in urinals, latrines or toilets. The tablets are designed for either continuous contact with the water source or intermittent contact with water, as is the case for example when the tablets are suspended in a urinal.

The following examples are presented by way of illustration only and are not deemed to be limiting thereof.

EXAMPLE 1

Run A

The compositions set forth in Table I were placed in a mixing bowl and blended. Thereafter, the mixing bowl was heated until the paradichlorobenzene ingredient melted. Mixing was continued while the paradichlorobenzene was melted so that it was uniformly dispersed throughout the mixture. The mixture was then cooled with agitation and mixing until the paradichlorobenzene solidified. Thereafter, the mixture was placed in a mortar and ground to a fine powder. Ten gram quantities of the formulations were tableted in a 1 5/16" die using a Carver laboratory press at pressures of between 5,000 and 10,000 lbs. on the ram. The tablets were then tested for relative dissolving time by means of an accelerated dissolving test. The test was performed by placing a tablet in a ½" mesh wire cage which was immersed in a transparent-sided Kenmore washer containing 16 gallons of agitated tap water of 70° F. The time required for the tablet to be reduced in size sufficiently to permit escape from the cage was designated as the dissolving time. Both the compositions of the tablets and the dissolving times are listed in Table I.

Run B

Several mixtures were made up containing the same proportion of ingredients as in Run A. However, in the make-up of these mixtures, the paradichlorobenzene component was not melted but was merely uniformly mixed with the other ingredients. Thereafter, 10 g. quantities of these mixtures were tableted in the same manner as in Run A. The formulations which were used and the dissolving time for the resulting tablets was determined in the manner described in Run A. The formulations which were used and the dissolving times of the resulting tablets are reported in Table I.

TABLE I

| Composition (wt. percent) | | | Formulation technique | Tablet dissolving time (sec.) |
|---|---|---|---|---|
| Trichloroisocyanuric acid | "Hexaphos" | Paradichlorobenzene | | |
| 25 | 25 | 50 | Run A | 30,000 |
| 25 | 25 | 50 | Run B | 4,400 |
| 25 | 45 | 30 | Run A | 18,500 |
| 25 | 45 | 30 | do | 5,710 |
| 25 | 53 | 22 | Run B | 1,090 |
| 25 | 53 | 22 | Run A | 2,970 |
| 25 | 60 | 15 | Run B | 870 |
| 25 | 60 | 15 | Run A | 2,080 |
| 25 | 65 | 10 | do | Over 50,000 |
| 5 | 0 | 95 | do | Over 50,000 |
| 10 | 0 | 90 | do | Over 50,000 |

The results shown in Table I clearly indicate that the tablet dissolving time increases with increases in the paradichlorobenzene content of the tablet. However, a comparison of the the dissolving time for identical mixtures, differing only in the manner in which the ingredients were blended, clearly shows that when the paradichlorobenzene is melted and the resultant mixture is ground and tableted the dissolving times are much greater than when identical mixtures are merely blended and formulated into tablets.

EXAMPLE 2

The process described in Example 1, Run A, was repeated using sodium dichloroisocyanurate in place of trichloroisocyanuric acid. The results obtained in the relative dissolving test were substantially the same as those obtained with trichloroisocyanuric acid.

What is claimed is:

1. A process for producing slow dissolving sanitizing tablets which comprises blending together a mixture containing from about 5 to about 25% of a compound selected from the group consisting of trichloroisocyanuric acid, dichloroisocyanuric acid, sodium dichloroisocyanurate and potassium dichloroisocyanurate, and paradichlorobenzene in amounts sufficient to make up the balance of the mixture, heating the mixture until the paradichlorobenzene melts, maintaining the melted mixture in constant agitation and in a homogeneous condition while permitting the mixture to cool, finely dividing the mixture to form small discrete particles containing said compound coated with paradichlorobenzene and pressing said discrete particles under pressure into compacted shapes.

2. Process of claim 1 wherein the paradichlorobenzene constitutes up to about 95% of the mixture.

3. Process of claim 1 wherein the mixture contains from about 5 to 25% of the compound selected from the group consisting of trichloroisocyanuric acid, dichloroisocyanuric acid, sodium dichloroisocyanuric acid and potassium dichloroisocyanuric acid, from 25 to 65% of a sodium polyphosphate selected from the group consisting of tetrasodium pyrophosphate, pentasodium tripolyphosphate and sodium polyphosphate glasses, and 10 to 50% paradichlorobenzene.

4. Process of claim 3 in which said sodium polyphosphate is a long chain glassy sodium polyphosphate containing about 13 molecules of sodium orthophosphate condensed into a chain, said polyphosphate having a $P_2O_5$ content of 67.5% by weight.

5. The product produced in accordance with the process of claim 1.

6. The product produced in accordance with the process of claim 3.

References Cited

UNITED STATES PATENTS

| | | | |
|---|---|---|---|
| 2,789,078 | 4/1957 | Trusler | 167—33 |
| 2,913,460 | 11/1959 | Brown et al. | 260—248 |
| 3,096,291 | 7/1963 | Schaver et al. | 252—99 |
| 3,108,046 | 10/1963 | Harbit | 167—82 |
| 3,120,378 | 2/1964 | Lee et al. | 252—95 |
| 3,147,219 | 9/1964 | Paterson | 210—62 |
| 3,293,188 | 12/1966 | Brown et al. | 252—187 |
| 3,296,069 | 1/1967 | Kowalski | 167—33 |

ALBERT T. MEYERS, Primary Examiner

STANLEY J. FRIEDMAN, Assistant Examiner

U.S. Cl. X.R.

21—58; 210—62; 252—106; 424—22